(12) United States Patent
Grueneberg et al.

(10) Patent No.: US 7,188,150 B2
(45) Date of Patent: Mar. 6, 2007

(54) SYSTEM AND METHOD FOR SHARING, SEARCHING, AND RETRIEVING WEB-BASED EDUCATIONAL RESOURCES

(75) Inventors: Keith W. Grueneberg, Stewart Manor, NY (US); Lei Kuang, Pleasantville, NY (US); Richard B. Lam, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 09/933,646

(22) Filed: Aug. 21, 2001

(65) Prior Publication Data

US 2003/0039944 A1    Feb. 27, 2003

(51) Int. Cl.
*G06F 15/16* (2006.01)
*G06F 7/00* (2006.01)

(52) U.S. Cl. ............... 709/217; 709/219; 707/1; 707/100

(58) Field of Classification Search ........ 709/217–219, 709/223–229; 434/118; 707/1, 4, 10, 100
See application file for complete search history.

(56) References Cited

U.S. PATENT DOCUMENTS 5,847,972 A * 12/1998 Eick et al. ............... 709/246
5,963,949 A * 10/1999 Gupta et al. ............... 707/100
6,377,950 B1 * 4/2002 Peters et al. ............... 707/10
2002/0004824 A1 * 1/2002 Cuan et al. ............... 709/208
2002/0038360 A1 * 3/2002 Andrews et al. ............ 709/223
2002/0102524 A1 * 8/2002 Rizzi et al. ............... 434/350
2002/0129042 A1 * 9/2002 Bradshaw et al. .......... 707/200
2003/0023712 A1 * 1/2003 Zhao et al. ............... 709/223

OTHER PUBLICATIONS

T Spaces, vol. 37, No. 3—Java Technology, by P. Wyckoff, S. W. McLaughry, T.J. Lehman and D.A. Ford.
Lotus Notes and Domino Network Design, by John P. Lamb and Peter W. Lew.

* cited by examiner

*Primary Examiner*—Glenton B. Burgess
*Assistant Examiner*—Yasin M. Barqadle
(74) *Attorney, Agent, or Firm*—Louis J. Percello, Esq.; Law Office of Charles W. Peterson, Jr.; Satheesh K. Karra, Esq.

(57) ABSTRACT

A system and method that enables sharing of resources and materials on a worldwide basis is disclosed. This system and method creates a secure extranet, with member sites communicating through a shared mediator service. The extranet protects private information at each site, yet allows searching and sharing of resources by authorized users of any extranet site. A preferred embodiment is an extranet of Lotus Notes/Domino servers, where information can be shared via the extranet without requiring cross-certification or replication among the servers.

6 Claims, 12 Drawing Sheets

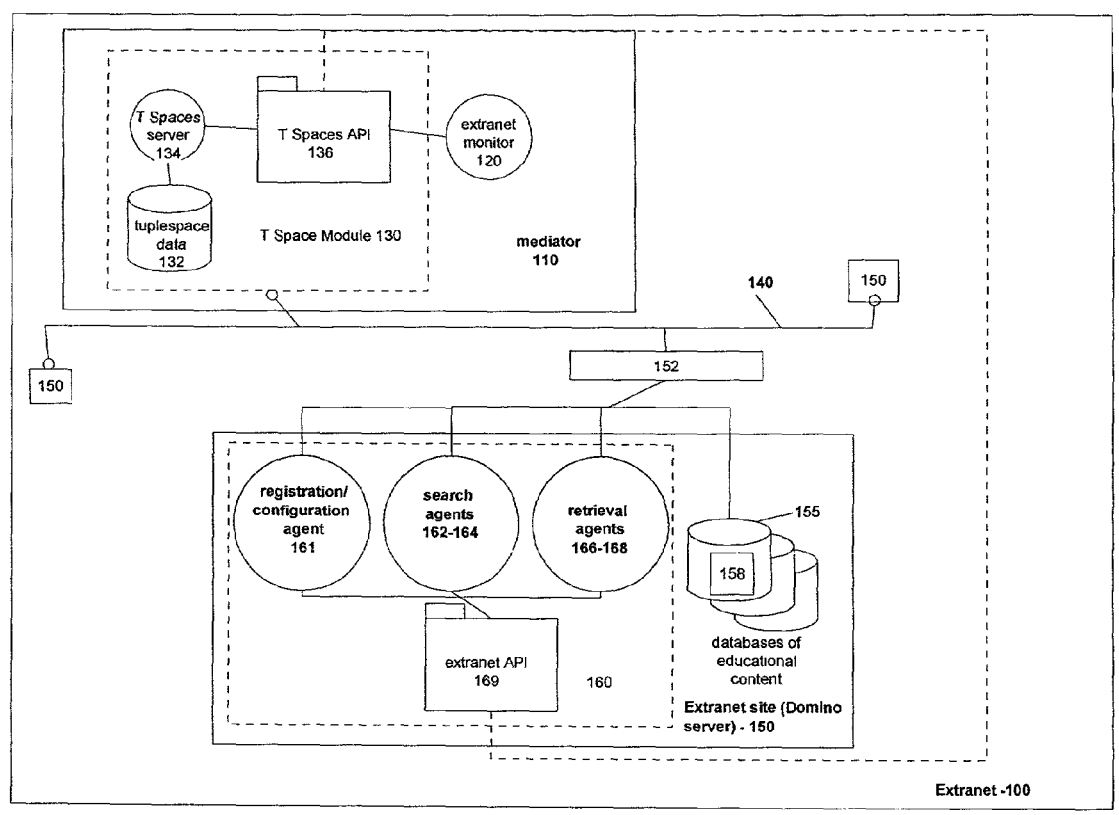
Figure 1: Overall Extranet System

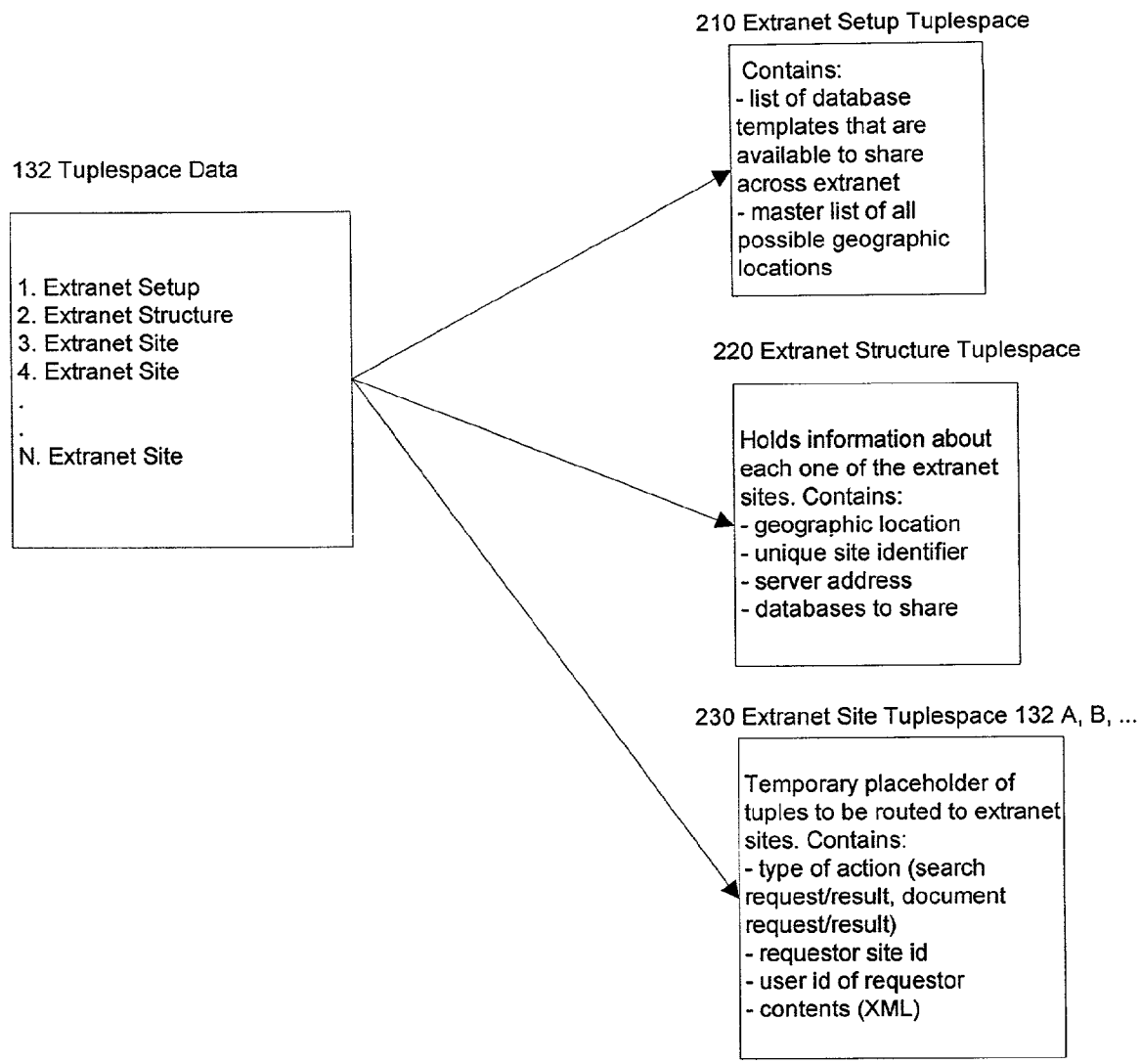
Figure 2: Tuplespace data structure

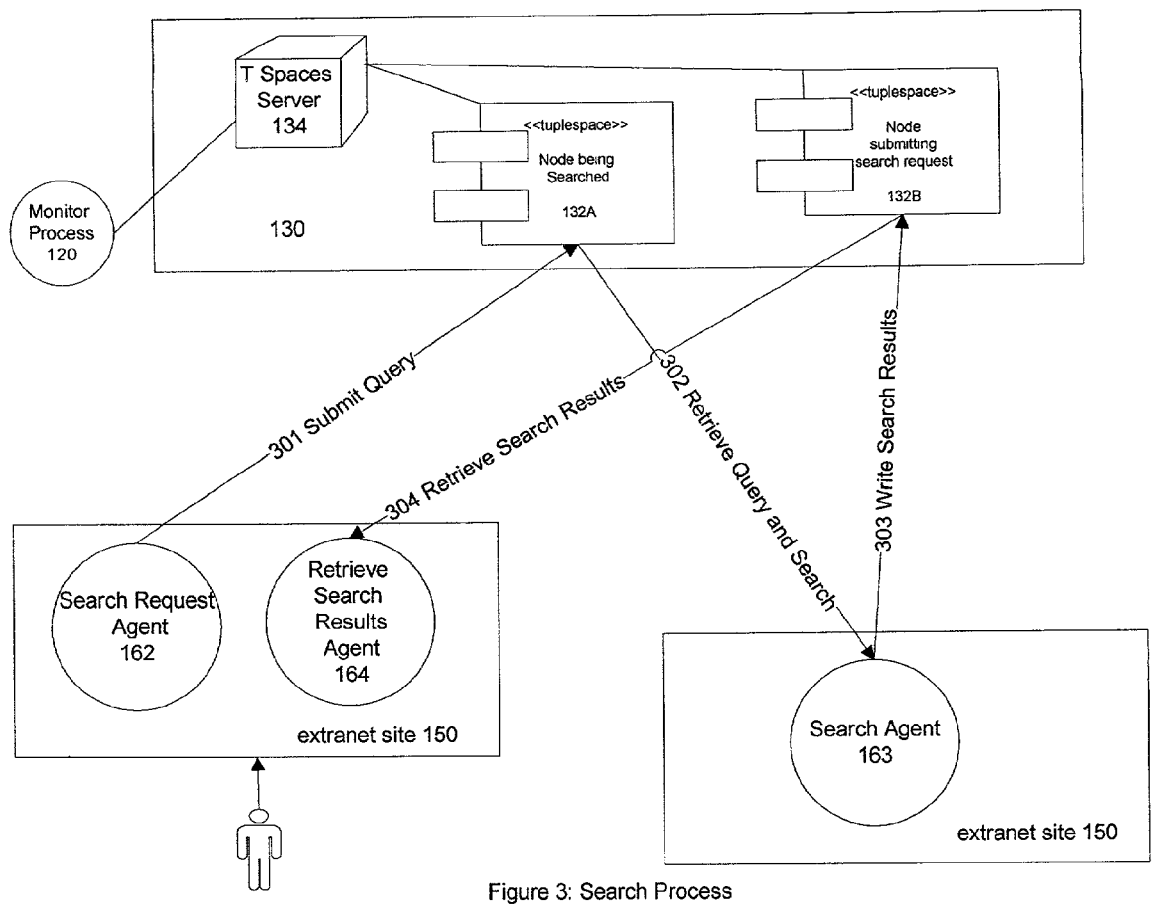
Figure 3: Search Process

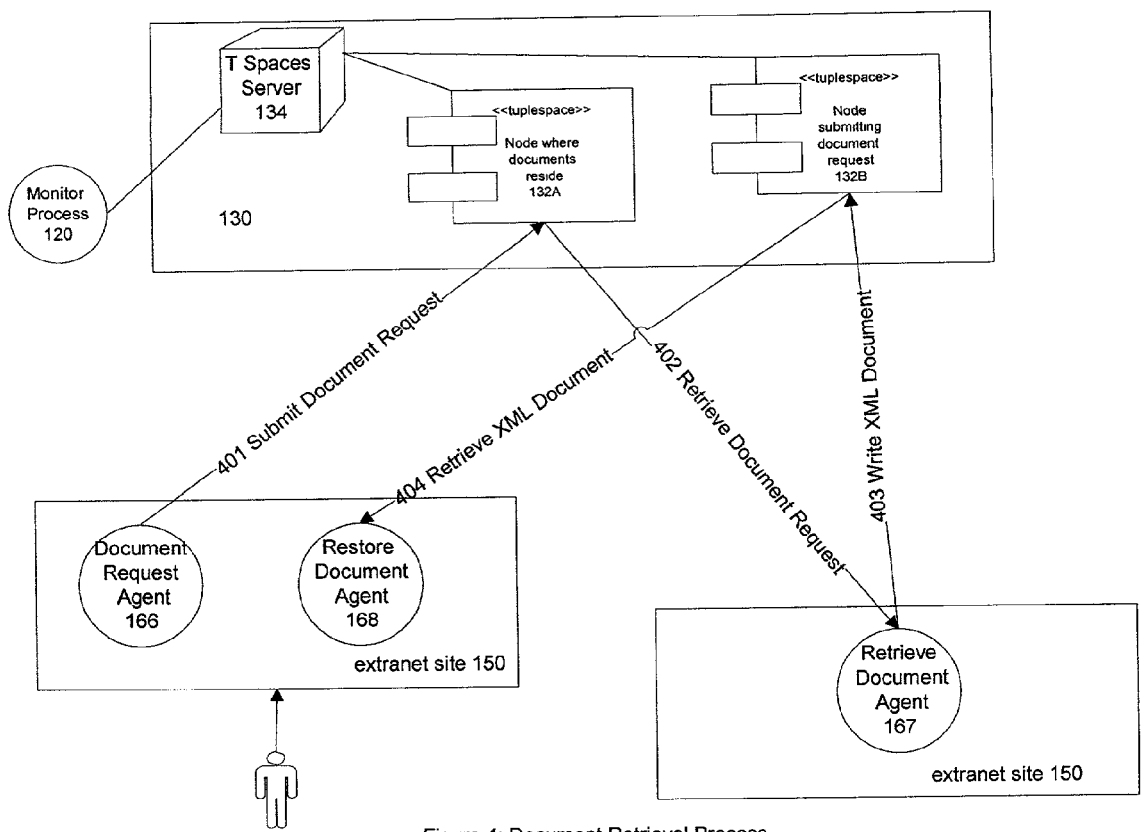
Figure 4: Document Retrieval Process

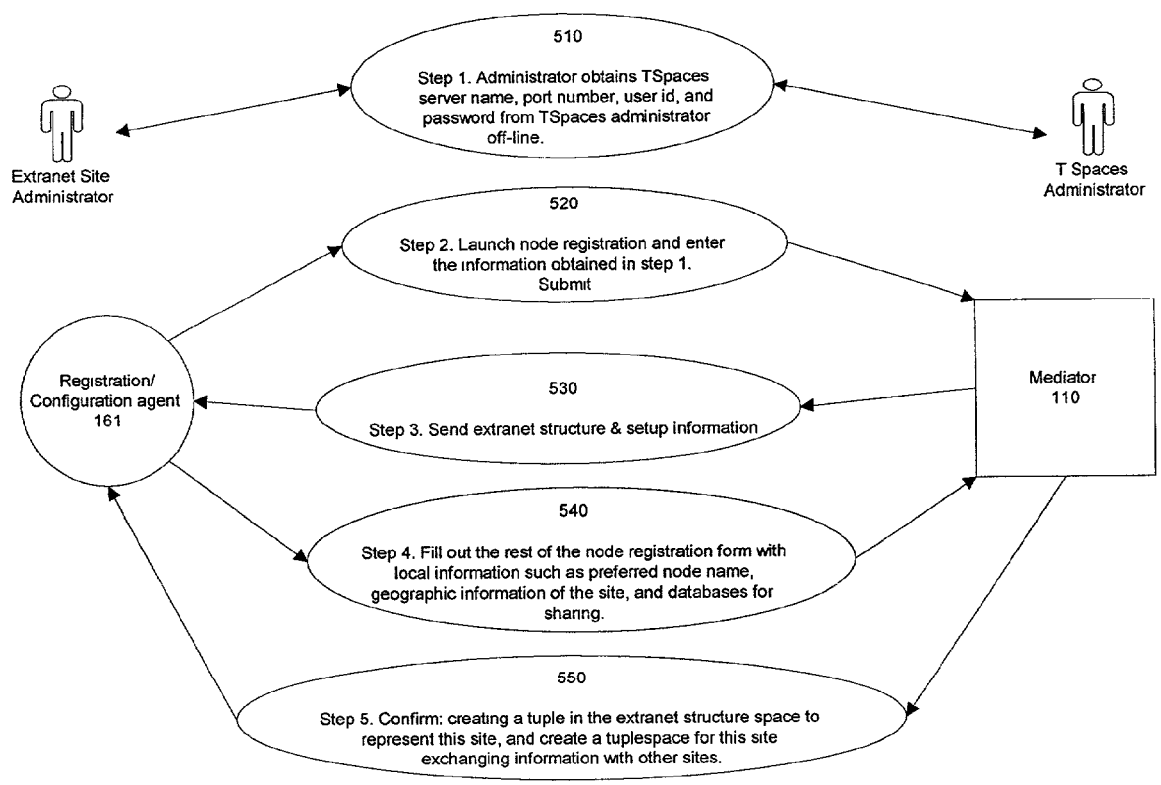
Figure 5: Site Configuration/ Registration Process

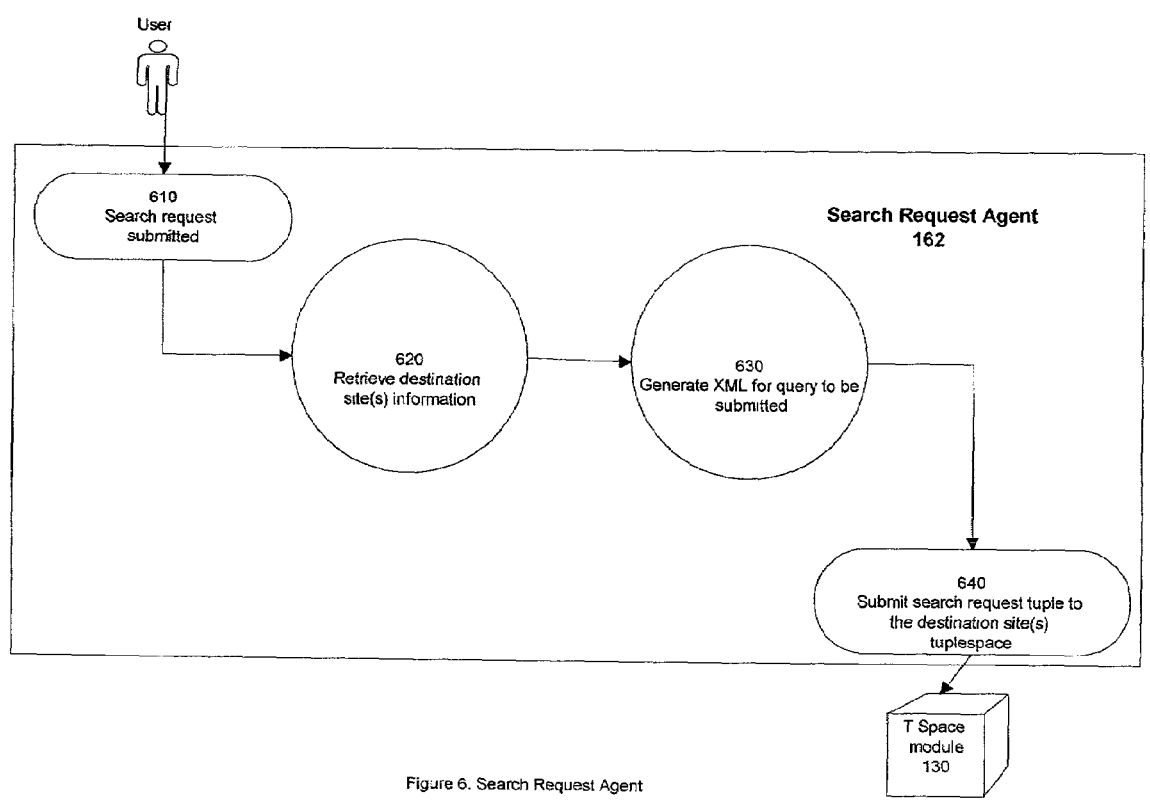
Figure 6. Search Request Agent

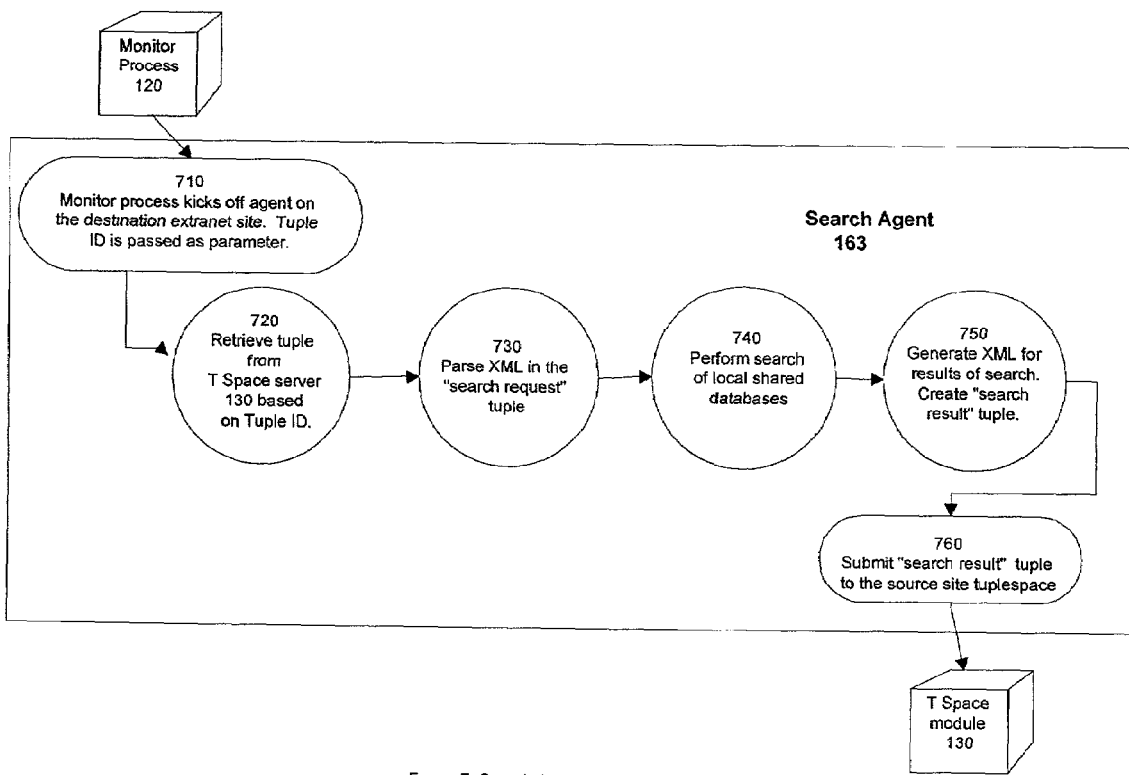
Figure 7: Search Agent

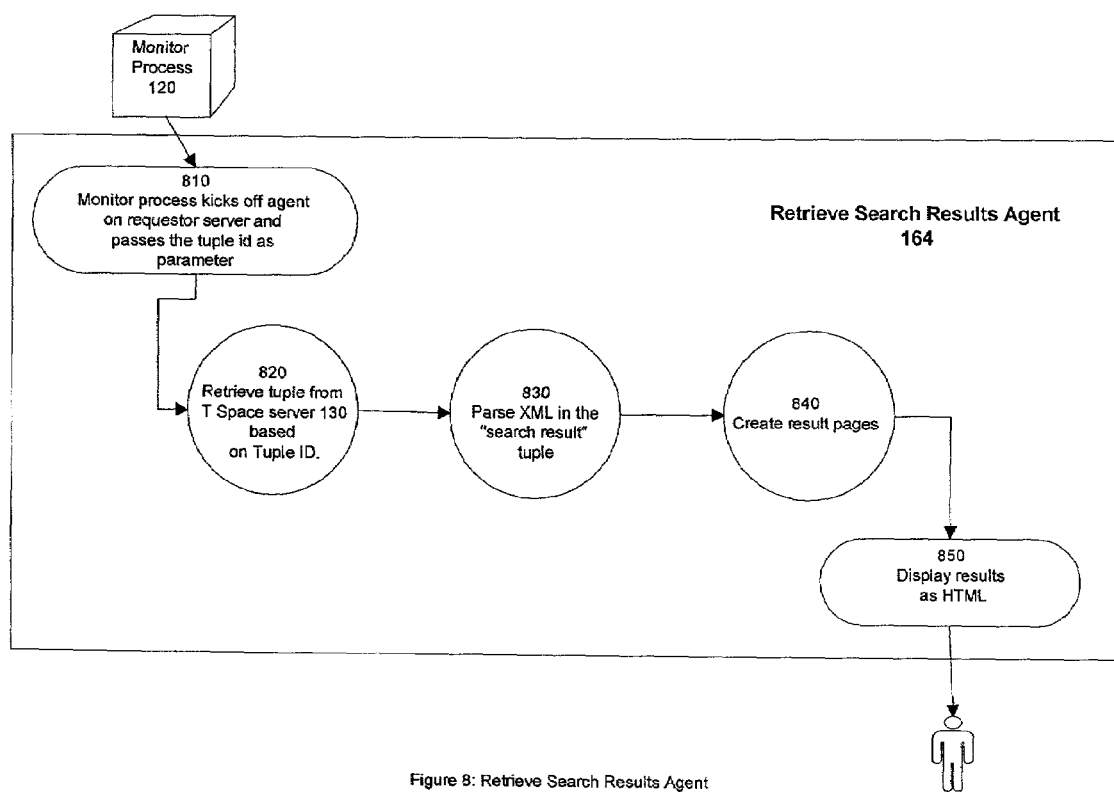
Figure 8: Retrieve Search Results Agent

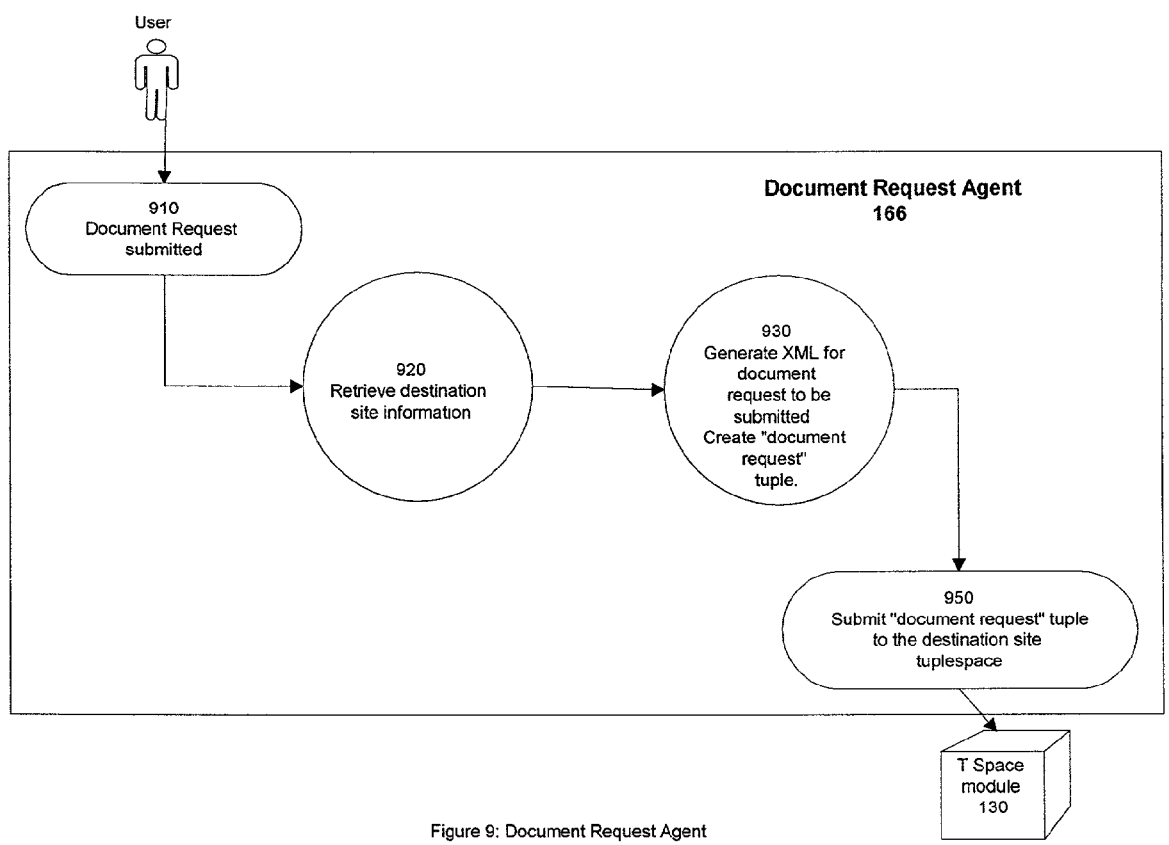
Figure 9: Document Request Agent

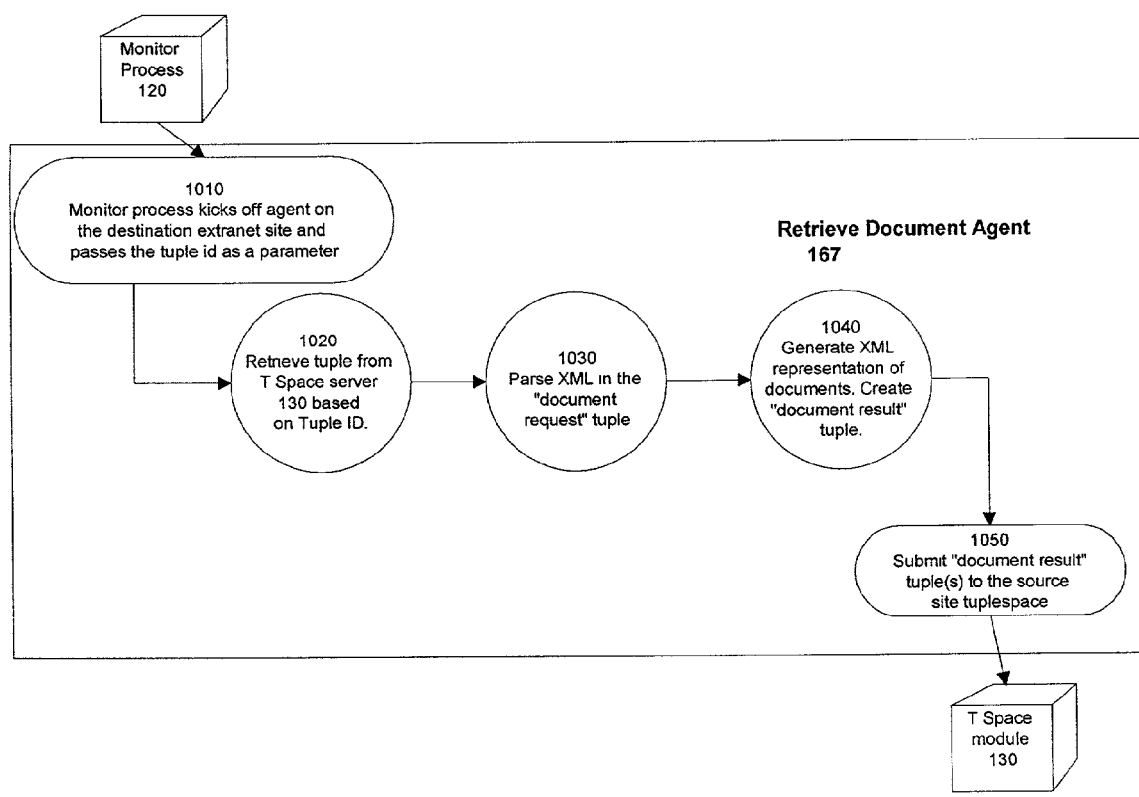
Figure 10: Retrieve Document Agent

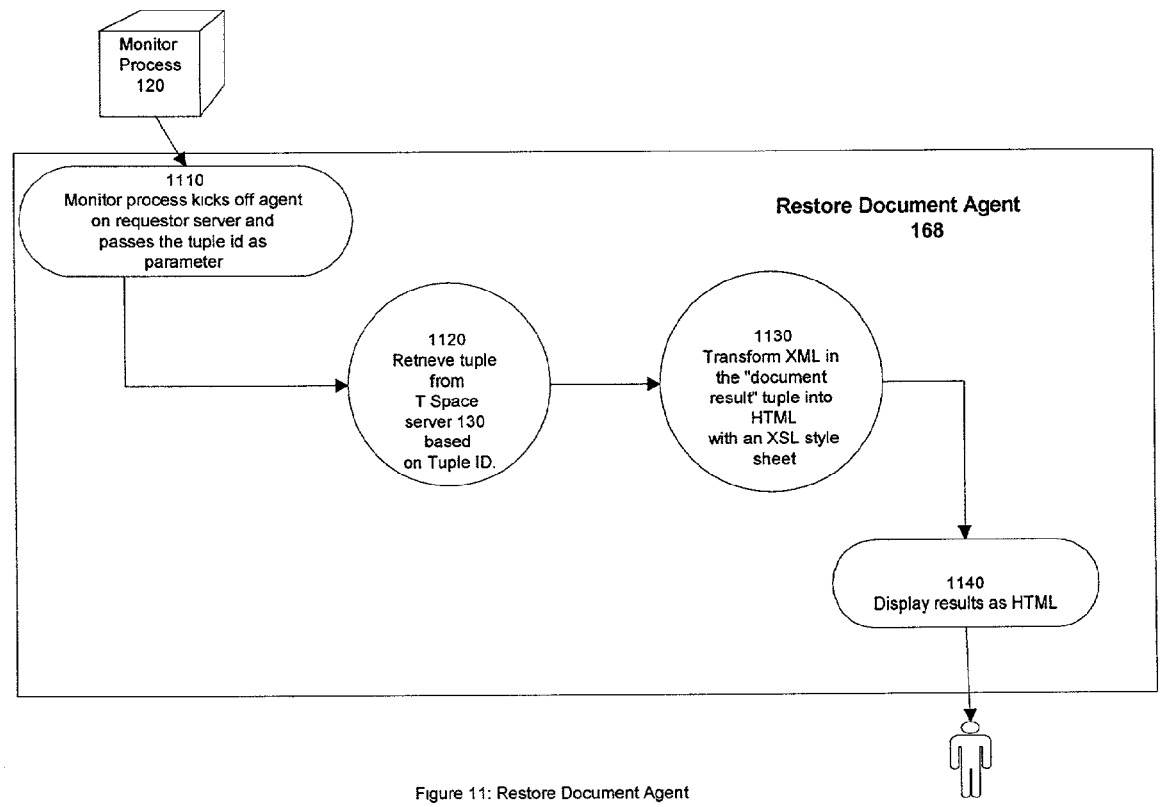
Figure 11: Restore Document Agent

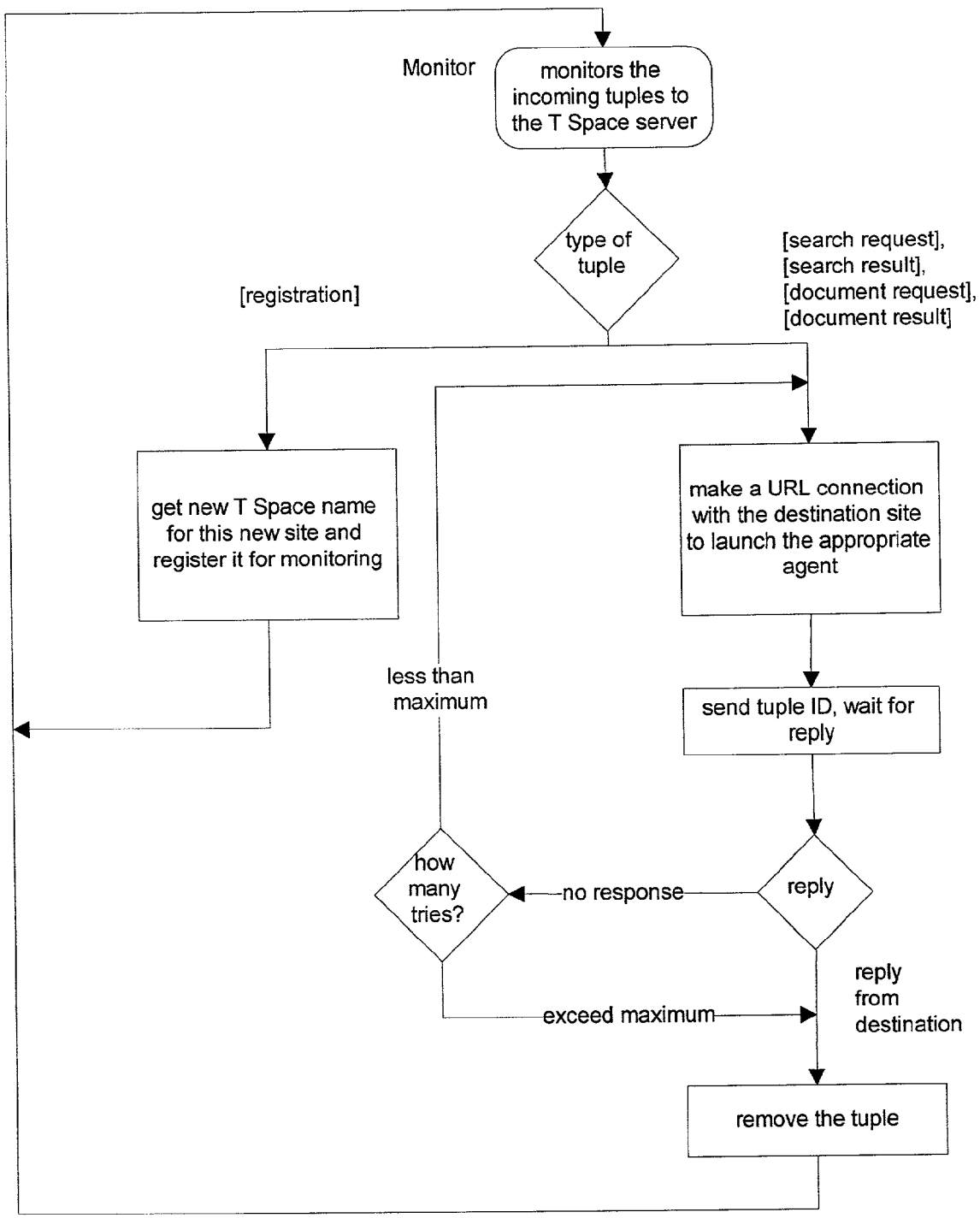
Figure 12: Extranet Monitor Process

SYSTEM AND METHOD FOR SHARING, SEARCHING, AND RETRIEVING WEB-BASED EDUCATIONAL RESOURCES

FIELD OF THE INVENTION

This invention relates to the field of shared resources that can be searched and retrieved over the World Wide Web (WWW or Web). More specifically, this invention relates to a method for: sharing educational resources such as lesson plans, student activities, and assessment criteria; selective or all-inclusive searching for relevant materials that reside in databases on other Web servers; and retrieving of the shared resources.

BACKGROUND OF THE INVENTION

Generally, the Web contains information that resides in pages coded in static Hypertext Markup Language (HTML) format. Numerous search engines are available that allow searching for specific information content within these pages. Typically, these engines rely on massive indices generated by Web crawlers. Web crawling describes a set of techniques that start from one or more Web locations, retrieve and index the information at that location or locations, and fan out to other Web locations by iterating through some number of links from the original source location. For each iteration, the crawler indexes the information and continues crawling through the Web.

Web-based information can also be stored and served to requestors from relational, object-oriented, or document-based databases. Lotus Notes/Domino is an example of a secure, document-based database system that stores information internally, dynamically generating an HTML rendering whenever a particular piece of information is requested. To the end user, the returned information is indistinguishable from that obtained from static Web pages. The difference is that standard Web search engines cannot index the pages originating from the database, because the information used in constructing the pages is dynamic and may be secured by a user id and password.

Lotus Notes has built-in search functions to search the dynamic content inside Notes databases, but such searching must take place on one server. If multiple databases, residing on two or more servers, need to be searched, the databases must be copied or replicated to a single server first. Furthermore, the servers must be cross-certified before replication can take place. This is the standard hub-and-spoke architecture for cross-site sharing of Notes-based information.

Specific examples of Web-based information stored in application databases are educational resources and materials. These resources and materials can be of many types: academic standards, instructional goals and objectives, assessment rubrics, benchmark examples of student work, lesson plans, student activities, and classroom or media resources. This information needs to be searched and retrieved by user interaction through standard Web browsers.

PROBLEMS WITH THE PRIOR ART

In the prior art, there are many education-related examples where parts of individual state, district, or school level instructional materials are available through the Web. Primarily, such materials are stored in HTML or Extensible Markup Language (XML) formats. Much of this information does not reside in searchable databases, or is available only through a plethora of proprietary database or XML formats.

Thus, while such information can be shared with other users, it cannot be searched in a consistent manner, and cannot be retrieved for immediate reuse. There is no general mechanism that allows storage of the data in a format that facilitates location of similar information. Nor is there an easy, consistent search and retrieval method designed for specific educational materials, particularly secure documents across diverse organizations.

For example, Web crawlers do not discriminate among the many different types of available information. Crawlers will search education-related as well as totally unrelated sites. Search engines built on Web crawler technology typically index HTML pages only—they do not penetrate well into information contained in databases. Nor do they penetrate into secure Web sites that are password-controlled. Also, search engines do not process queries based on the latest information available, which is important in Web sites hosting dynamic content.

Searching Notes databases solves some of these problems, but not all. Notes databases can be searched for dynamic content, but only if those databases to be searched reside on the same server. This requires replication connections to be defined among servers, and also requires cross-certification of the servers. Typically, one server is a hub that cross-certifies with other servers acting as spokes. Searching is carried out on replica copies of databases on the hub. However, unless database and document security are defined for users across the spoke servers, only public data across the sites is shareable.

OBJECTS OF THE INVENTION

An object of this invention is a framework that defines an extranet of member sites.

Another object of this invention is a method of searching one or more extranet nodes in the system by generating queries that search databases shared throughout the extranet, while maintaining the security of the information on a site-by-site basis.

Another object of this invention is a method of retrieving documents shared by an extranet site, and delivering the documents to another extranet site for reuse, while maintaining the security of other documents shared by the extranet sites.

SUMMARY OF THE INVENTION

This invention is a system and method that enables sharing of resources and materials on a worldwide basis. In most cases, users wish to share intellectual property within a particular organization, yet protect that property from access by outsiders. In contrast, other users (a preferred embodiment being schools, school districts, and departments of education) generate knowledge shareable across organizational boundaries.

This system and method creates a secure extranet, with member sites communicating through a shared mediator service. The extranet protects private information at each site, yet allows searching and sharing of resources by authorized users of any extranet site. A preferred embodiment is an extranet of Lotus Notes/Domino servers, where information can be shared via the extranet without requiring cross-certification or replication among the servers.

BRIEF DESCRIPTION OF THE FIGURES

The foregoing and other objects, aspects, and advantages will be better understood from the following non limiting detailed description of preferred embodiments of the invention with reference to the drawings that include the following:

FIG. 1 is a block diagram of one preferred embodiment of the present invention at system level 100.

FIG. 2 is a block diagram of the tuplespace data structure.

FIG. 3 is an information flow diagram of a search process.

FIG. 4 is an information flow diagram of a document retrieval process.

FIG. 5 is a flow chart of the configuration/registration process.

FIG. 6 is a flow chart of the search request agent.

FIG. 7 is a flow chart of the search agent.

FIG. 8 is a flow chart of the retrieve search results agent.

FIG. 9 is a flow chart of the document request agent.

FIG. 10 is a flow chart of the retrieve document agent.

FIG. 11 is a flow chart of the restore document agent.

FIG. 12 is a flow chart of an extranet monitor process.

DETAILED DESCRIPTION OF THE INVENTION

This invention allows one server to act as an extranet communications mediator that holds and passes information, queries, and documents to extranet member servers.

FIG. 1 is a block diagram on one preferred embodiment of the present invention at system level 100.

The system 100 comprises one or more networks 140, e.g. the Internet, that connect one or more servers 150 through one or more network interfaces 152. The server 150 can be any known server. In a preferred embodiment, the server 150 is Domino server that is a product of the IBM corporation. These servers have generally known databases 155. In a preferred embodiment, the databases contain educational resources, such as lesson plans, stored as documents. Generally, these documents 158 can be stored in a proprietary format, e.g., Lotus Notes.

The server 150 includes a novel extranet module 160. The extranet module 160 comprises a registration/configuration agent 161, search agents 162–164, retrieval agents 166–168, and an extranet Application Programming Interface (API) 169.

The registration/configuration agent 161 allows the extranet site administrator to register the site's participation in the extranet. See the description of FIG. 5 below for further detail.

The search agents 162–164 are three separate agents that handle the search requests and return the results. See the description of FIGS. 3, 6, 7, and 8 below for further detail.

The retrieval agents 166–168 are three separate agents that handle the document request and retrieval. See the description of FIGS. 4, 9, 10, and 11 below for further detail.

In addition, a novel mediator server 110 is connected to the network 140 by well known means. The mediator server 110 comprises a novel extranet monitor 120 and a "T Space module" 130.

The mediator server 110 serves as the communications hub, or bus, that connects all of the extranet sites 150. The mediator 110 is based on two processes:
1. A T Spaces server 130, which is a communications buffer and data repository; and,
2. An extranet monitor 120, which is a listener for changes to data maintained by the TSpaces server.

The T Spaces module 130 contains a TSpaces server 134 and the T Spaces API 136 are described in *T Spaces* (P. Wyckoff, S. W. McLaughry, T. J. Lehman, D. A. Ford, *IBM Systems Journal*, Vol 37, No. 3, 1998) which is herein incorporated by reference in its entirety. The T Spaces module maintains a database of tuples, organized into tuplespaces 132. For further detail of the tuplespace data structure for this invention see FIG. 2 below. A tuple is simply an ordered set of fields, where each field contains some piece of data (an integer, string, character, etc.). Each site that joins the extranet for searching and sharing data is assigned its own tuplespace. Tuplespaces act as mailboxes for sending and receiving message tuples. The T Spaces software is available at http://www.alphaworks.ibm.com.

The extranet monitor 120 detects incoming tuples into the T Space server and routes them according to the tuple type. See the description of FIG. 12 below for further detail.

FIG. 2 is block diagram of the tuplespace data structure 132.

The extranet tuplespace data structure is comprised of 3 different types of tuplespaces: extranet setup, extranet structure and extranet site.

The extranet setup tuple space 210 contains the list of the resources that are available to share on the extranet. In a preferred embodiment, the resources correspond to Lotus Notes templates. The setup tuplespace also contains the master list of all the possible geographic locations. This is needed to configure a new extranet site.

The extranet structure tuplespace 220 contains information about all of the participating extranet sites. A tuple is created for each site which contains the geographic locations of the site, a unique site identifier, the Internet address of the server and the resources the site chose to share. In a preferred embodiment, the shared resources are Lotus Notes databases. So, the database location on the server would be included in the tuple.

There is an extranet she tuplespace 230 for each participating extranet site. This is a placeholder for the tuples that are routed to each site. The tuples can be one of the following type: search request, search result, document request or document result. Each tuple will contain the user id of the requester, a requester site id, and the contents in XML.

FIG. 3 is a information flow diagram of a search process.

A user at participating extranet site 150 will submit a query to search one or more of the extranet sites. The search request agent 162 will submit the "search request" tuple to the tuplespace of the destination site(s) (301). For further detail of the search request agent 162, see FIG. 6 below.

The monitor process 120 will detect the incoming tuple and launch the search agent 163 on the destination site(s) (302). The agent is launched by opening a URL connection. For further detail of the search agent 163, see FIG. 7 below.

When the search is complete, the search agent 163 will submit the "search result" tuple to the requestor's tuplespace (303). The monitor process 120 will detect the incoming tuple and launch the retrieve search results agent 164 on the requesting site (304). For further detail of the retrieve search results agent 164, see FIG. 8 below.

FIG. 4 is an information flow diagram of a document retrieval process.

A user at participating extranet site 150 will select the documents to be retrieved from the list of search results. The document request agent 166 will submit the "document request" tuple to the tuplespace of the destination site(s) (401). For further detail of the document request agent 166, see FIG. 9 below.

The monitor process 120 will detect the incoming tuple and launch the retrieve document agent 167 on the destination site(s) (402). For further detail of the search agent 167, see FIG. 10 below.

When the document(s) are located on the destination site, the retrieve document agent 167 will submit the "document result" tuple(s) to the requestor's tuplespace (403). The monitor process 120 will detect the incoming tuple and launch the restore document agent 168 on the requesting site (404). For further detail of the restore document agent 168, see FIG. 11 below.

FIG. 5 is a flow chart of the configuration/registration process.

Prior to step 1 of the registration process, some software will need to be installed at the new extranet site. In a preferred embodiment, the new software consists of two Lotus Notes databases: Node Manager and Query Manager. The Node Manager database contains the registration/configuration agent 161.

In step 1 (510), the administrator of the extranet site obtains the information to connect to the T Spaces server from the T Spaces administrator off-line (e.g. phone conversation, e-mail, etc.). The extranet site administrator will then fill out a form in the Node Manager database with the T Spaces server name, port number, user id and password. When the form is submitted, the registration/configuration agent 161 is launched (520).

The extranet monitor, which is part of the mediator 110, detects the incoming registration request. For further detail of the extranet monitor, see FIG. 12 below. The mediator sends the extranet structure and setup information back to the extranet site (530).

The extranet site administrator will then fill out the rest of the registration form with the geographic location of the site, preferred node name, and the databases the site chooses to be available for sharing (540).

In step 5 (550), the mediator service confirms the registration to the user after the extranet monitor creates the corresponding tuplespace data structure for the new extranet site. For further detail of the extranet data structure, see the FIG. 2 explanation above.

FIG. 6 is a flow chart of the search request agent.

A user at a participating extranet site will submit a search request (610). In a preferred embodiment, a Lotus Notes database holds the search form. The user enters the search words or phrases, the types of Lotus Notes databases to search, and the extranet sites to search. When the form is submitted, the search request agent 162 is launched.

The search request agent 162 determines the destination site(s) to be searched (620). An XML representation of the search request is generated including the requestor's user id, the search terms, and the resource types to search (630). A "search request" tuple is submitted to the T Space module 130 for each destination site (640). In a preferred embodiment, the resource types are specified as Lotus Notes templates.

FIG. 7 is a flow chart of the search agent.

The monitor process 120 detects the incoming "search request" tuple and launches the search agent 163 on the destination site (710). The id of tuple is passed as a parameter.

The tuple is retrieved from the T Space module 130 using the tuple id (720) and the XML contents are parsed (730). The destinations site's databases are searched for any matches (740). In a preferred embodiment, the selected Lotus Notes databases are searched using a full-text search. Any reference to any matching documents are saved as search results.

XML is generated from the search results and a "search result" tuple is created (750). The "search result" tuple is submitted to the TSpace module (760).

FIG. 8 is a flow chart of the retrieve search results agent.

The monitor process 120 detects the incoming "search result" tuple and launches the search agent 164 on the requester site (810). The id of tuple is passed as a parameter.

The tuple is retrieved from the T Space module 130 by the tuple id (820) and the XML contents are parsed (830). An HTML page is generated from the search results (840 and 850).

FIG. 9 is a flow chart of the document request agent.

The user at the requester site will select the documents to be retrieved from the list of search results. When the form is submitted, the document request agent 166 is launched. (910)

The document request agent 166 determines the destination site(s) for the documents to be retrieved (920). An XML representation of the document request is generated including the requestor's user id, and an identifier of the document to be retrieved (930). A "document request" tuple is submitted to the T Space module 130 for each destination site (940).

FIG. 10 is a flow chart of the retrieve document agent.

The monitor process 120 detects the incoming "document request" tuple and launches the retrieve document agent 167 on the destination site (1010). The id of tuple is passed as a parameter.

The tuple is retrieved from the T Space module 130 by the tuple id (1020) and the XML contents are parsed (1030). The document is located on the destination site. An XML representation of the document is generated and a "document result" tuple is created (1040). The "document result" tuple is submitted to the T Space module (1050).

FIG. 11 is a flow chart of the restore search results agent.

The monitor process 120 detects the incoming "document result" tuple and launches the search agent 168 on the requester site (1110). The id of tuple is passed as a parameter.

The tuple is retrieved from the T Space module 130 by the tuple id (1120). The XML representation of the document is shown to the user as HTML using XSL (Extensible Stylesheet Language) (1130 and 1140)). A style sheet is chosen based on the type of document that is retrieved. In a preferred embodiment, a different style sheet is created for each type of educational content: lesson plans, activity plans, descriptions of educational resources, descriptions of teaching strategies, and curriculum content. The user can then choose to save the document in the local database.

FIG. 12 is a flow chart of an extranet monitor process.

The extranet monitor process 120 is a Java application that utilizes the T Spaces API to define multiple listeners that detect changes in tuplespace data. When a new tuple is submitted to the T Space server, the monitor detects the tuple and determines what action to take.

As part of the registration process (see FIG. 5 above for details), a "registration" tuple is submitted to the T Space server. A tuple space is created for each new extranet site and a listener is created for each tuplespace that corresponds to an extranet member site. A listener is a known Java method for event handling.

The other types of requests can either be a search or a document retrieval operation. These operations are carried out on the target site's local databases. The results are written back to the T Spaces server through a package of extranet API functions written in Java.

Lotus Notes/Domino is a trademark of IBM and Lotus Corporation. Learning Village is an Internet framework for K-12 educational applications that is an IBM product. TSpaces is an IBM Research project. Java is a trademark of Sun Microsystems, Inc.

We claim:

1. A computer system comprising:
   a computer with one or more memories, one or more central processing units, and one or more interfaces to one or more networks;
   a tuplespace data structure that identifies one or more server computers, a geographic location for each server computer, and authorized, password-protected shared data fields made available through the network to create an extranet image; and
   an extranet monitor that detects incoming messages from one or more requester server computers, being one of the server computers, determines a service required by the message, the service comprising any one or more of:
      a search for one or more documents,
      a retrieval of one or more documents, and
      a registration of the server computers for participation in the extranet;
   wherein the extranet monitor stores a service request corresponding to the service in the tuplespace data structure along with the geographic location of the requester server computer and one or more destination server computers, the destination server computers each being a server computer, the extranet monitor further selects destination server computers that can respond to the request and routes the message to the selected destination server computers, each destination server computer defining specific content that can be searched and retrieved from said each destination server computer in response to messages from the extranet monitor; and
   wherein the extranet monitor receives an XML representation of a document list that matches the original request in response from selected destination server computers and routes the document list to the requester server computer.

2. A computer system comprising:
   a computer with one or more memories, one or more central processing units, and one or more interfaces to one or more networks;
   a tuplespace data structure that identifies one or more server computers, a geographic location for each server computer, and authorized, password-protected shared data fields made available through the network to create an extranet image; and
   an extranet monitor that detects incoming messages from one or more requester server computers, being one of the server computers, determines a service required by the message, the service comprising any one or more of:
      a search for one or more documents,
      a retrieval of one or more documents, and
      a registration of the server computers for participation in the extranet;
   wherein the extranet monitor stores a service request corresponding to the service in the tuplespace data structure along with the geographic location of the requester server computer and one or more destination server computers, the destination server computers each being a server computer, the extranet monitor further selects destination server computers that can respond to the request and routes the message to the selected destination server computers, each destination server computer defining specific content that can be searched and retrieved from said each destination server computer in response to messages from the extranet monitor, and
   wherein the extranet monitor receives an XML representation of a document in response from destination server computers and routes the document to the requester server computer, the XML document representation containing any one or more of the following:
      proprietary content, and
      educational content including lesson plans,
      activity plans,
      descriptions of educational resources,
      descriptions of teaching strategies, and
      curriculum content.

3. A computer system as in claim 1, wherein the detected incoming messages are incoming tuples to the tuplespace data structure and the extranet monitor monitors said incoming tuples for changes to the tuplespace data structure.

4. A computer system as in claim 3, wherein the extranet monitor includes a listener for each tuplespace that corresponds to one of said one or more server computers, each said listener detecting said changes to the tuplespace data structure and handling services for a corresponding one.

5. A computer system as in claim 2, wherein the detected incoming messages are incoming tuples to the tuplespace data structure and the extranet monitor monitors said incoming tuples for changes to the tuplespace data structure.

6. A computer system as in claim 5, wherein the extranet monitor includes a listener for each tuplespace that corresponds to one of said one or more server computers, each said listener detecting said changes to the tuplespace data structure and handling services for a corresponding one.

* * * * *